United States Patent
Hamdoon et al.

(10) Patent No.: US 11,993,211 B2
(45) Date of Patent: May 28, 2024

(54) DOOR-TRIM PANEL HAVING COLLAPSIBLE RIBS AND GROOVES

(71) Applicant: Ford Global Technologies, LLC, Dearborn, MI (US)

(72) Inventors: Muhsin M. Hamdoon, Ontario (CA); Marwan Ahmad Elbkaily, Canton, MI (US); Humberto Memetla Martinez, Mexico City (MX); Jeffery Howell, Novi, MI (US); Israel Hiram Loza, Mexico City (MX); Robin Burnett, Clinton Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 421 days.

(21) Appl. No.: 17/230,030

(22) Filed: Apr. 14, 2021

(65) Prior Publication Data

US 2022/0332262 A1    Oct. 20, 2022

(51) Int. Cl.
| | |
|---|---|
| *B60R 13/01* | (2006.01) |
| *B60J 5/04* | (2006.01) |
| *B60N 2/75* | (2018.01) |
| *B60R 13/02* | (2006.01) |
| *B60R 22/28* | (2006.01) |

(52) U.S. Cl.
CPC ......... *B60R 13/0243* (2013.01); *B60J 5/0469* (2013.01); *B60N 2/78* (2018.02); *B60J 5/0413* (2013.01); *B60J 5/0451* (2013.01)

(58) Field of Classification Search
CPC ....... B60R 13/0243; B60J 5/0469; B60N 2/78
See application file for complete search history.

(56) References Cited

U.S. PATENT DOCUMENTS

| | | | |
|---|---|---|---|
| 5,443,478 A | 7/1995 | Narusse | |
| 5,641,195 A * | 6/1997 | Patel | B60R 13/025 296/146.7 |
| 5,820,191 A * | 10/1998 | Blakewood, Jr. | B60J 5/0416 296/146.7 |
| 6,068,320 A * | 5/2000 | Miyano | B60R 13/025 296/187.05 |

(Continued)

FOREIGN PATENT DOCUMENTS

| | | | |
|---|---|---|---|
| DE | 102010040021 A1 * | 3/2012 | ............. B60N 2/466 |
| JP | 2914598 B2 | 4/1999 | |
| JP | 5095285 B2 | 12/2012 | |

*Primary Examiner* — Phi D A
(74) *Attorney, Agent, or Firm* — Frank A. MacKenzie; Bejin Bieneman PLC

(57) ABSTRACT

A door-trim panel for a vehicle includes an armrest and a top roll extending upwardly from the armrest to an upper end. The upper end has an inboard portion and an outboard portion and the upper end is elongated along a longitudinal axis. The top roll includes pairs of ribs spaced from each other along the longitudinal axis. The pairs of ribs include an inboard rib extending from the inboard portion toward the outboard portion to an outboard end. The pairs of ribs include an outboard rib adjacent to and spaced from the inboard rib of that pair. The outboard rib extends from the outboard portion toward the inboard portion to an inboard end of the outboard rib. The inboard ribs and outboard ribs are elongated transverse to the longitudinal axis. The inboard end and the outboard end are spaced from the inboard portion of the top roll.

20 Claims, 8 Drawing Sheets

(56) References Cited

U.S. PATENT DOCUMENTS

| | | | |
|---|---|---|---|
| 6,170,902 B1 | 1/2001 | Sakuma et al. | |
| 6,199,907 B1* | 3/2001 | Mugford | B60R 21/04 |
| | | | 280/805 |
| 6,991,279 B2 | 1/2006 | Sweers et al. | |
| 7,726,727 B2* | 6/2010 | Bhattacharjee | B60J 5/0452 |
| | | | 296/187.05 |
| 8,562,064 B2 | 10/2013 | Yamaguchi et al. | |
| 10,518,615 B2 | 12/2019 | Hamdoon et al. | |
| 2010/0327646 A1* | 12/2010 | Hori | B60N 2/78 |
| | | | 297/411.21 |
| 2011/0089713 A1* | 4/2011 | Yamaguchi | B60R 13/0243 |
| | | | 296/146.7 |
| 2013/0320705 A1* | 12/2013 | Okada | B60J 10/40 |
| | | | 296/146.2 |
| 2014/0355285 A1* | 12/2014 | Yamato | B60Q 3/217 |
| | | | 362/509 |
| 2015/0283956 A1* | 10/2015 | Halliwell | B60J 5/0469 |
| | | | 403/269 |
| 2015/0329057 A1* | 11/2015 | Tiboni | B60J 5/04 |
| | | | 296/37.13 |

* cited by examiner

DOOR-TRIM PANEL HAVING COLLAPSIBLE RIBS AND GROOVES

BACKGROUND

A vehicle door includes at least one door panel, e.g., an inner panel and an outer panel, and a door-trim panel mounted to the door panel. The door panel in some examples is metal, such as steel or aluminum and the door-trim panel faces a passenger compartment of the vehicle. The door-trim panel can be aligned with the thorax of a vehicle occupant seated next to the vehicle door. During certain side impact crashes, the door-trim panel may be designed to interact with the occupant in the event the occupant, for crash energy management.

DETAILED DESCRIPTION

Figure 1:
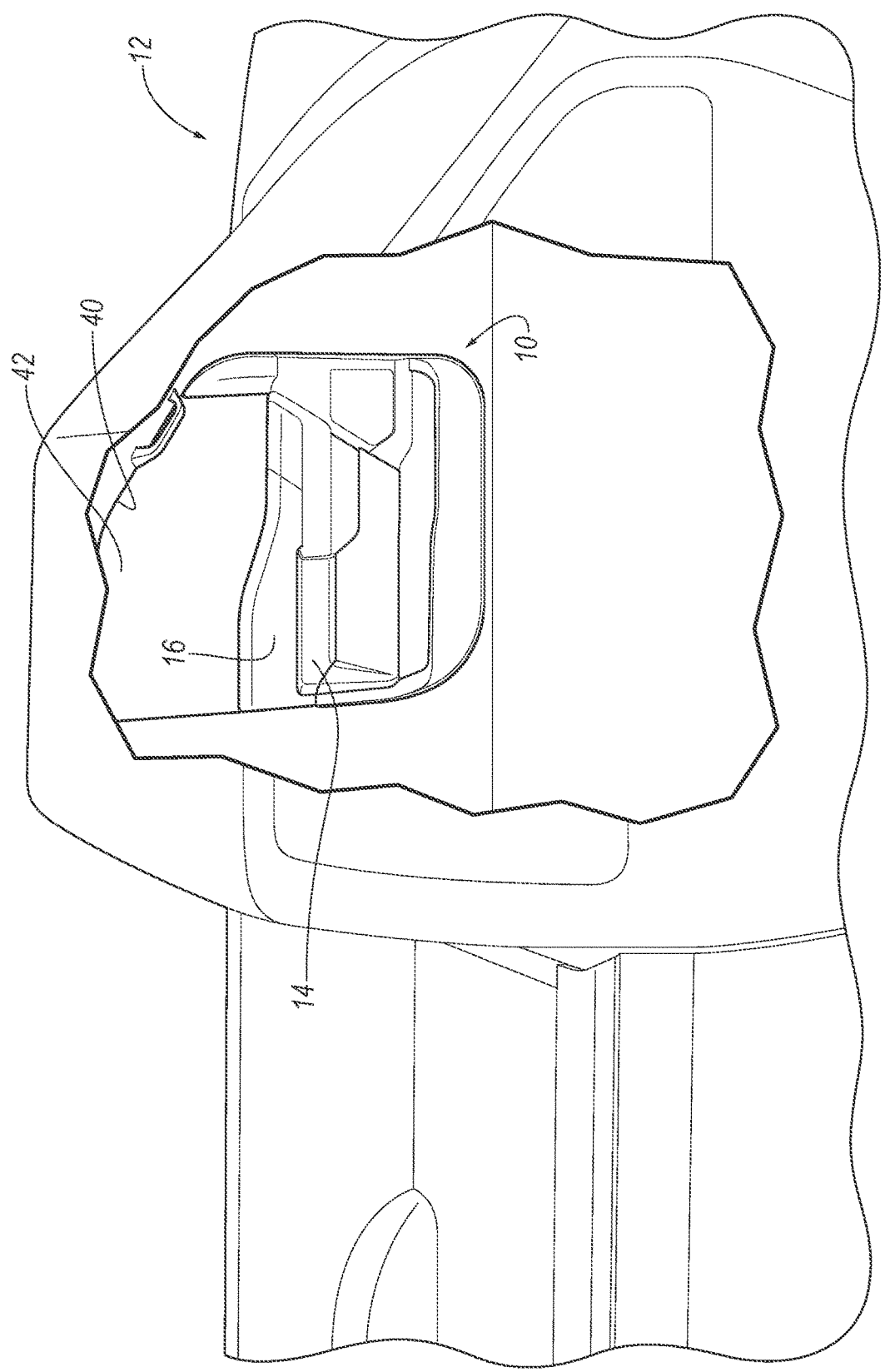
FIG. 1 is a cut-away view into a vehicle having a door-trim panel.

A door-trim panel includes an armrest. The door-trim panel includes a top roll extending upwardly from the armrest to an upper end. The upper end has an inboard portion and an outboard portion and the upper end being elongated along a longitudinal axis. The top roll includes pairs of ribs, the pairs of ribs being spaced from each other along the longitudinal axis. Each of the pair of ribs including an inboard rib extending from the inboard portion toward the outboard portion to an outboard end. For each pair of ribs, the inboard rib is elongated transverse to the longitudinal axis and the outboard end of the inboard rib is spaced from the inboard portion of the top roll. Each of the pair of ribs includes an outboard rib adjacent to and spaced from the inboard rib of that pair. For each of the pair of ribs, the outboard rib extends from the outboard portion toward the inboard portion to an inboard end of the outboard rib, the outboard rib being elongated transverse to the longitudinal axis and the inboard end of the outboard rib being spaced from the inboard portion of the top roll.

The inboard end of the outboard rib may be inboard of the outboard end of the inboard rib.

The inboard ribs and the outboard ribs may be in alternating arrangement along the longitudinal axis.

The inboard ribs and the outboard ribs may be elongated generally parallel to each other.

The inboard ribs and outboard ribs may be elongated generally perpendicular to the longitudinal axis.

The upper end may include an upper surface from which the inboard ribs and the outboard ribs protrude downwardly, and further comprising a gusset extending from at least one of the inboard ribs to the upper surface.

The pairs of ribs may be positioned to be aligned with a thorax of a vehicle occupant.

The door-trim panel may include a flange extending downwardly from the outboard portion of the upper end, the flange defining a groove extending downwardly from the upper end.

The top roll may include an upper surface from which the inboard ribs and the outboard ribs protrude downwardly, the upper surface including a first groove and a second groove each elongated along the longitudinal axis, one of the first or second grooves being inboard of the other along the longitudinal axis.

The upper surface may include a plurality of short grooves including the second groove, the short grooves being spaced from each other along the axis, and the first groove extending along at least two of the short grooves.

The short grooves may be co-linear.

The inboard ribs or the outboard ribs may be in alternating arrangement with the short grooves.

The top roll may include a second set of short grooves, the inboard ribs being in alternating arrangement with the short grooves and the outboard ribs being in alternating arrangement with the second set of short grooves.

A door-trim panel includes an armrest. The door-trim panel includes a top roll extending upwardly from the armrest to an upper end, the upper end having an inboard end, an outboard end, and an upper surface extending from the inboard end to the outboard end, the upper end being elongated along a longitudinal axis. The upper surface includes a first groove and a second groove, the first groove and the second groove being between the inboard end and the outboard end and being elongated along the longitudinal axis, the first and second grooves being spaced from each other in a direction perpendicular to the longitudinal axis.

The upper surface may include a plurality of short grooves including the second groove, the short grooves being spaced from each other along the axis, and the first groove extending along at least two of the short grooves.

The short grooves may be co-linear.

The top roll may include ribs extending downwardly from the upper surface in alternating arrangement with the short grooves.

The top roll may include a second set of short grooves, inboard ribs extending downwardly from the upper surface in alternating arrangement with the short grooves, and outboard ribs extending downwardly from the upper surface in alternating arrangement with the second set of short grooves.

The first groove may extend along at least two short grooves of the second set of short grooves.

With reference to the Figures, wherein like numerals indicate like parts throughout the several views, a door-trim panel 10 for a vehicle 12 includes an armrest 14 and a top roll 16 extending upwardly from the armrest 14 to an upper end 18. The upper end 18 has an inboard portion 20 and an outboard portion 22 and the upper end 18 is elongated along a longitudinal axis L. The top roll 16 includes pairs of ribs 24 spaced from each other along the longitudinal axis L. Each of the pair of ribs 24 includes an inboard rib 26 extending from the inboard portion 20 toward the outboard portion 22 to an outboard end 28. For each pair of ribs 24, the inboard rib 26 is elongated transverse to the longitudinal axis L and the outboard end 28 of the inboard rib 26 is spaced from the inboard portion 20 of the top roll 16. Each of the pair of ribs 24 includes an outboard rib 30 adjacent to and spaced from the inboard rib 26 of that pair. For each of the pair of ribs 24, the outboard rib 30 extends from the outboard portion 22 toward the inboard portion 20 to an inboard end 32 of the outboard rib 30. The outboard rib 30 is elongated transverse to the longitudinal axis L and the inboard end 32 of the outboard rib 30 is spaced from the inboard portion 20 of the top roll 16.

In the event of an impact to the vehicle 12, specifically a side impact to the vehicle 12, the force of the impact may cause a vehicle occupant to shift in the vehicle 12 and move against the door-trim panel 10. A thorax of the vehicle occupant may contact the door-trim panel 10 in the event of an impact to the vehicle 12. In such an event, the pairs of ribs 24 of the door-trim panel 10, specifically the spacing between the outboard rib 30 and the inboard rib 26 of each pair, allow the top roll 16 to collapse. The collapsing of the top roll 16 absorbs energy from the vehicle occupant moving toward and against the door-trim panel 10. The energy absorption may allow for less deflection of the thorax of the vehicle occupant.

With reference to FIG. 1, the vehicle 12 may be any suitable type of automobile, e.g., a passenger or commercial automobile such as a sedan, a coupe, a truck, a sport utility, a crossover, a van, a minivan, a taxi, a bus, etc. The vehicle 12, for example, may be autonomous. In other words, the vehicle 12 may be autonomously operated such that the vehicle 12 may be driven without constant attention from a driver, i.e., the vehicle 12 may be self-driving without human input.

The vehicle 12 includes a body (not numbered) including rockers, roof rails (not numbered), pillars, body panels, roof, floor, etc. The vehicle 12 includes a passenger compartment (not numbered) to house vehicle occupants, if any, of the vehicle 12. The passenger compartment may extend across the vehicle 12, i.e., from one side to the other side of the vehicle 12. The passenger compartment includes a front end and a rear end with the front end being in front of the rear end during forward movement of the vehicle 12.

With continued reference to FIGS. 1, the vehicle 12 may include one or more seats 34. Specifically, the vehicle 12 may include any suitable number of seats 34. As shown in Figure X, the seats 34 are supported by a vehicle floor (not numbered). The seats 34 may be arranged in any suitable arrangement in the passenger compartment. As in the example shown in the Figures, one or more of the seats 34 may be at the front end of the passenger compartment, e.g., a driver seat and/or a passenger seat. In other examples, one or more of the seats 34 may be behind the front end of the passenger compartment, e.g., at the rear end of the passenger compartment. The seats 34 may be movable relative to the vehicle floor to various positions, e.g., movable fore-and-aft and/or cross-vehicle. The seats 34 may be of any suitable type, e.g., a bucket seat.

The seats 34 include the seatback 36 and a seat bottom (not numbered). The seatback 36 may be supported by the seat bottom and may be stationary or movable relative to the seat bottom. The seatback 36 and the seat bottom may be adjustable in multiple degrees of freedom. Specifically, the seatback 36 and the seat bottom may themselves be adjustable. In other words, adjustable components within the seatback 36 and/or the seat bottom, and/or may be adjustable relative to each other.

Figure 2:
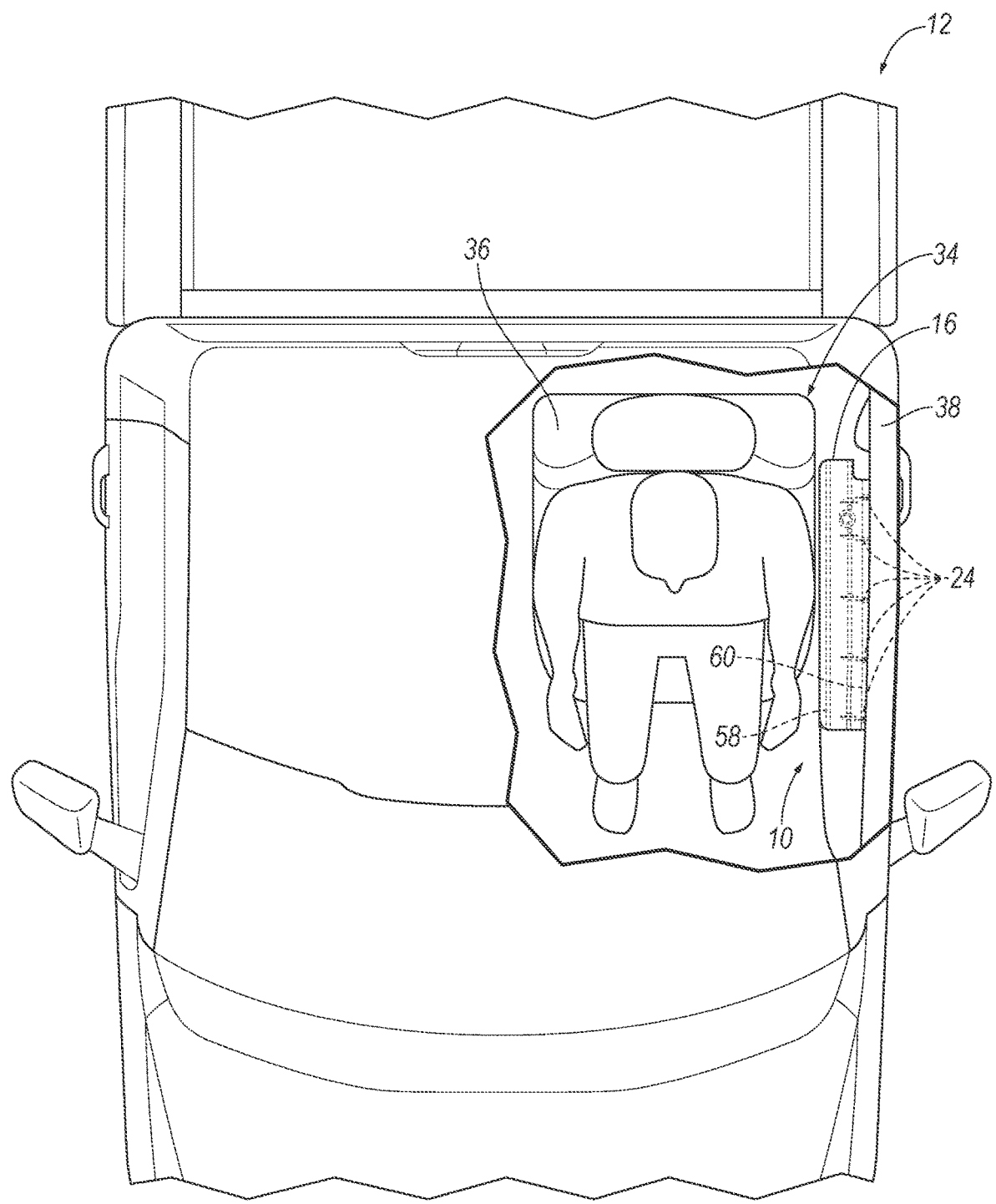
FIG. 2 is a top view of the vehicle showing the door-trim panel adjacent a vehicle occupant.

With reference to FIGS. 1 and 2, the vehicle 12 includes a plurality of doors 38 openable for vehicle occupants to enter and exit a passenger compartment. Each of the doors 38 are adjacent a seat 34 in the vehicle 12. Each of the front seats 34 and each of the rear seats (not shown) may be adjacent a door 38 of the vehicle 12. Specifically, each front seat 34 may be adjacent a front door 38 and each rear seat may be adjacent a rear door (not numbered). The doors 38 are vehicle-outboard from each of the front seats 34 and each of the rear seats.

The roof rails contact a top edge of the doors 38 when the doors 38 are closed. Each door 38 includes at least one door panel (not numbered) and the door-trim panel 10 supported on the door panel. Specifically, the door 38 may include two panels, namely a door inner (not numbered) and a door outer (not numbered). In such an example, the door-trim panel 10 and the door outer are fixed to the door inner. The door-trim panel 10 is positioned opposite the door outer. The door-trim panel 10 is inboard relative to the door inner, and the door outer is outboard relative to the door inner. The door includes a window opening 40 that may be completely closed by a window 42 of the window 42 is in a fully raised position. The window opening 40 is defined by the door-trim panel 10 and door outer on a bottom edge and either by the door inner circumscribing the window opening 40 or by the body, e.g., the A pillar, the B pillar, and the roof rail. The door outer faces outboard relative to the vehicle 12.

The door outer may define a portion of the exterior of the vehicle 12. For example, the door outer may present a class-A surface, i.e., a surface specifically manufactured to have a high-quality, finished aesthetic appearance free of blemishes. The door outer may be metal (such as steel, aluminum, etc.) or polymeric (such as fiber reinforced plastic composite, etc.).

The door inner may be metal (such as steel, aluminum, etc.) or polymeric (such as fiber reinforced plastic composite, etc.). The door inner provides structural rigidity for the door outer. The door inner may provide a mounting location for components of the door 38.

The door-trim panel 10 may include a covering 44 supported by the top roll 16. The covering 44 may include upholstery, padding, etc. The upholstery may be cloth, leather, faux leather, or any other suitable material. The upholstery may be stitched in panels around the top roll 16. The padding may be between the covering 44 and the top roll 16 and may be foam or any other suitable material. The door-trim panel 10 may be a material suitable for an interior of the vehicle 12, such as vinyl, plastic, leather, wood, etc.

The door-trim panel 10 includes the armrest 14 extending along a vehicle-longitudinal direction when the door 38 is in the closed position. The armrest 14 may be used by a vehicle occupant in the seat 34 adjacent the door-trim panel 10 during operation of the vehicle 12.

The top roll 16 extends upwardly from the armrest 14 to the upper end 18. The upper end 18 is elongated from a vehicle-rearward end 46 to a vehicle-forward end 48. Specifically, the upper end 18 is elongated along a longitudinal axis L from the vehicle-rearward end 46 to the vehicle-forward end 48. The longitudinal axis L extends along the vehicle-longitudinal direction, i.e., a fore-and-aft direction of the vehicle 12 adjacent the seat 34 and vehicle occupant in the seat 34. The upper end 18 extends in a cross-vehicle direction C away from the armrest 14 and toward the window 42 and window opening 40, i.e., the upper end 18 extends outboard away from the armrest 14 and toward the window 42 and window opening 40.

The upper end 18 defines a centerline extending along the center of the upper end 18 and along the longitudinal axis L. The centerline may extend along a center of the upper end 18, i.e., dividing the upper end 18 into the inboard portion 20 and the outboard portion 22. The inboard portion 20 and the outboard portion 22 each extend along the longitudinal axis L from the vehicle-rearward end 46 of the upper end 18 to the vehicle-forward end 48 of the upper end 18. The inboard portion 20 extends along the longitudinal axis L inboard of the centerline of the upper end 18. The outboard portion 22 extends along the longitudinal axis L outboard of the centerline of the upper end 18.

The inboard portion 20 of the upper end 18 extends along the longitudinal axis L from the centerline of the upper end 18 in a vehicle-inboard direction to an inboard end 50. The inboard end 50 may be spaced from the window 42 and window opening 40 by the upper end 18 of the top roll 16. The outboard portion 22 extends from the centerline of the upper end 18 in a vehicle-outboard direction to an outboard end 52 that is spaced from the inboard end 50. In other words, the outboard portion 22 extends from the centerline in an opposite direction from the inboard portion 20. The outboard end 52 of the outboard portion 22 may be adjacent the window 42 and window opening 40, i.e., spaced from the inboard end 50 by the upper end 18.

The upper end 18 includes an upper surface 54 extending in the cross-vehicle direction C from the inboard end 50 to the outboard end 52 of the upper end 18. The upper surface 54 is elongated along the longitudinal axis L of the upper end 18 from the vehicle-rearward end 46 to the vehicle-forward end 48. The upper surface 54 faces downwardly, i.e., the upper surface 54 is located on an underside of the upper end 18.

With reference to FIGS. 4-7, the top roll 16 includes pairs of ribs 24 supported by the upper end 18. Specifically, the pairs of ribs 24 are supported by the upper surface 54 of the upper end 18. The pairs of ribs 24 allow the top roll 16 of the door-trim panel 10 to collapse in the event of an impact to the vehicle 12. The vehicle occupant may shift in the vehicle 12 during the impact and the collapsing of the pairs of ribs 24 absorbs energy from the vehicle occupant. The ribs may be unitary with the upper end 18, i.e., the ribs and the upper end 18 a single, uniform piece of material with no seams, joints, fasteners, or adhesives holding the together and formed together simultaneously as a single continuous unit, e.g., by injection molding. As another example, the ribs and the upper end 18 may be formed separately and subsequently assembled, e.g., by adhesive, ultrasonic welding, etc.

The pairs of ribs 24 are spaced from each other along the longitudinal axis L, i.e., the pairs of ribs 24 may be spaced from each other on the upper surface 54 and along the longitudinal axis L. The pairs of ribs 24 protrude downwardly from the upper end 18. Specifically, the pairs of ribs 24 protrude downwardly from the upper surface 54. In other words, the pairs of ribs 24 extend downwardly from the upper end 18, i.e., the upper surface 54 of the upper end 18. The top roll 16 may include any suitable number of pairs of ribs 24 to allow collapsing of the top roll 16 in the event a vehicle occupant contacting the door-trim panel 10 during an impact to the vehicle 12. In the example shown in the Figures, specifically FIGS. 4 and 6, the top roll 16 includes five pairs of ribs 24 spaced from each other along the longitudinal axis L of the upper end 18.

As shown in FIG. 2, the pairs of ribs 24 may be positioned along the top roll 16 to be aligned with a thorax of the vehicle occupant. In the event of an impact to the vehicle 12, the force from the impact may cause the vehicle occupant to shift in the passenger compartment of the vehicle 12 and the vehicle occupant may move toward and contact the door-trim panel 10. The pairs of ribs 24 collapse to absorb energy from the vehicle 12 occupant shifting in the passenger compartment and may allow for less deflection of the thorax of the vehicle occupant.

Figure 5:
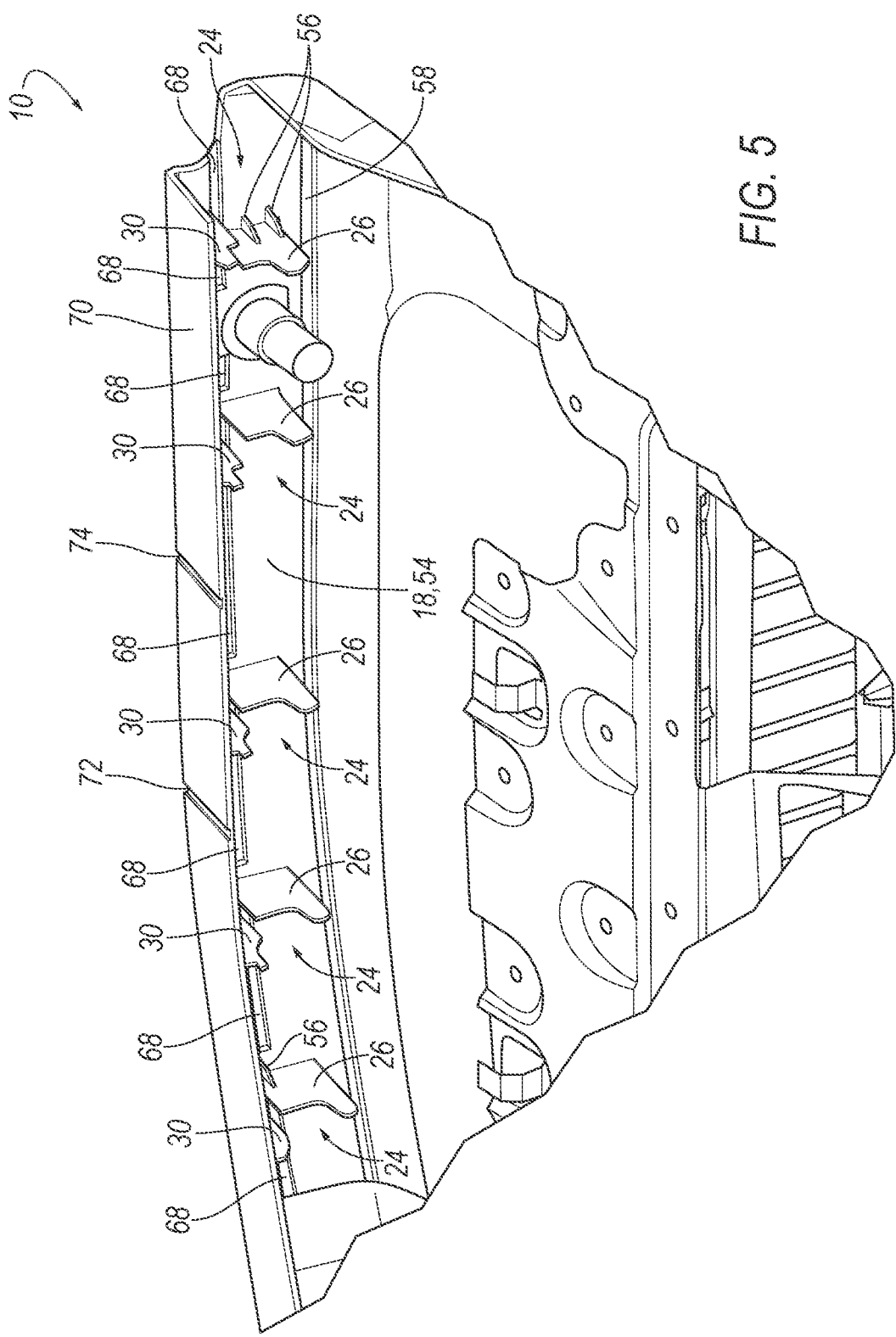
FIG. 5 is an underside, perspective view of the top roll of the door-trim panel having a flange extending downwardly from the top roll and including a pair of grooves.
Figure 6:
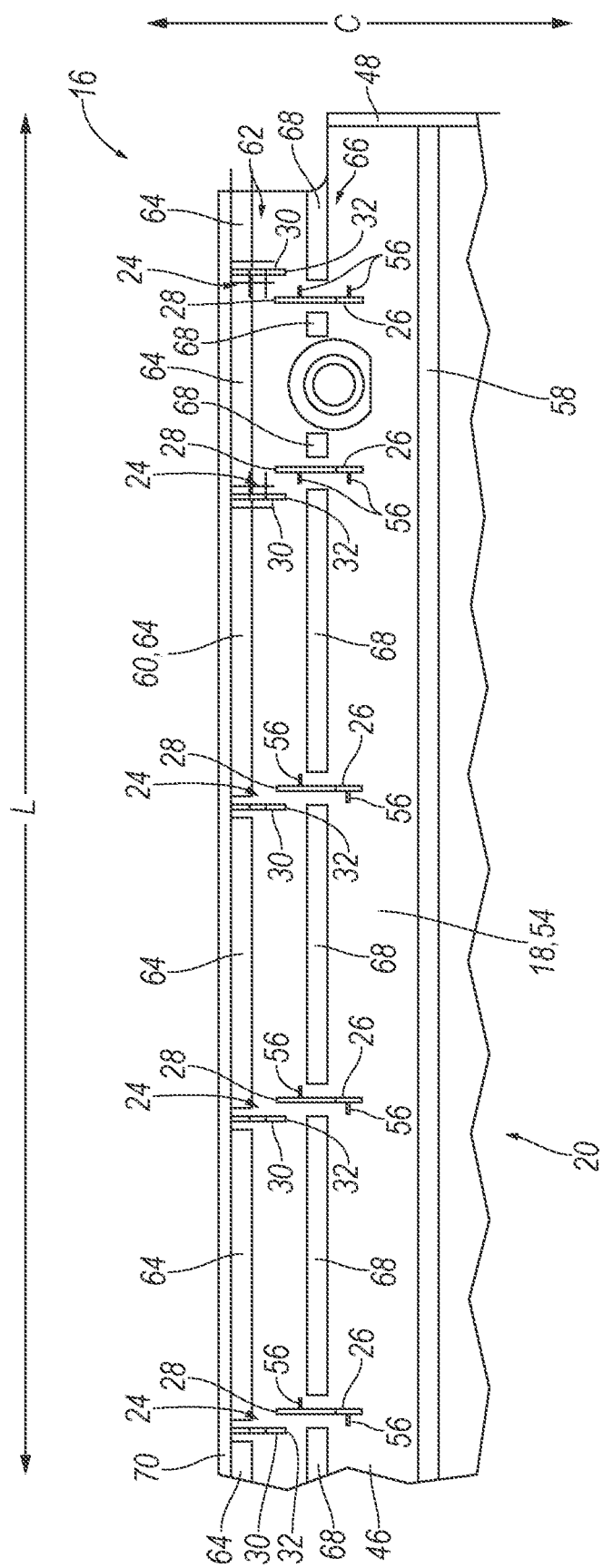
FIG. 6 is an underside view of the top roll having the grooves and ribs.

As shown in FIGS. 5 and 6, each of the pairs of ribs 24 includes an inboard rib 26 and an outboard rib 30 protruding downwardly from the upper surface 54 of the upper end 18, i.e., the inboard rib 26 and the outboard rib 30 extend downwardly from the upper surface 54. For each of the pairs of ribs 24, the outboard rib 30 is adjacent to and spaced from the inboard rib 26 of that pair along the longitudinal axis L. In other words, for each pair of ribs 24, the inboard rib 26 and the outboard rib 30 may be offset from each other along the longitudinal axis L, i.e., the inboard ribs 26 are not aligned with the outboard ribs 30. Specifically, the inboard rib 26 of each pair is spaced along the longitudinal axis L from the corresponding outboard rib 30 of the pair. The inboard rib 26 and the outboard rib 30 are spaced nearer to each other than each of the pairs of ribs 24, i.e., relative to the spacing between the pairs of the ribs, the spacing between the inboard rib 26 and the outboard rib 30 of each pair is shorter.

The inboard ribs 26 and the outboard ribs 30 may be in alternating arrangement along the longitudinal axis L. In other words, the inboard rib 26 of each pair of ribs 24 may alternate with the outboard rib 30 of each pair of ribs 24 along the longitudinal axis L.

The inboard ribs 26 and outboard ribs 30 are elongated between the inboard end 50 and the outboard end 52 of the upper end 18. Specifically, the inboard ribs 26 and the outboard ribs 30 of each pair of ribs 24 are elongated generally parallel to each other. The adverb "generally" means that the inboard ribs 26 and the outboard ribs 30 may slightly deviate from parallel relative to each other due to manufacturing and/or design of the top roll 16 and the vehicle 12.

For each of the pairs of ribs 24, the inboard rib 26 is vehicle-inboard of the outboard rib 30, i.e., the outboard rib 30 is vehicle-outboard of the inboard rib 26. In other words, at least a portion of the inboard rib 26 is vehicle-inboard of the outboard rib 30 and at least a portion of the outboard rib 30 is vehicle-outboard of the inboard rib 26.

For each pair of ribs 24, the inboard rib 26 extends from the inboard portion 20 toward the outboard portion 22 to an outboard end 28. The outboard end 28 of the inboard rib 26 is the farthest point vehicle-outboard of the inboard rib 26. As shown in the example in the Figures, specifically, FIGS. 3B and 6, at least one of the inboard ribs 26 extends across the centerline toward the outboard portion 22 and onto the outboard portion 22, i.e., the outboard end 28 of the inboard rib 26 is spaced from the inboard portion 20 of the top roll 16.

Figure 3:
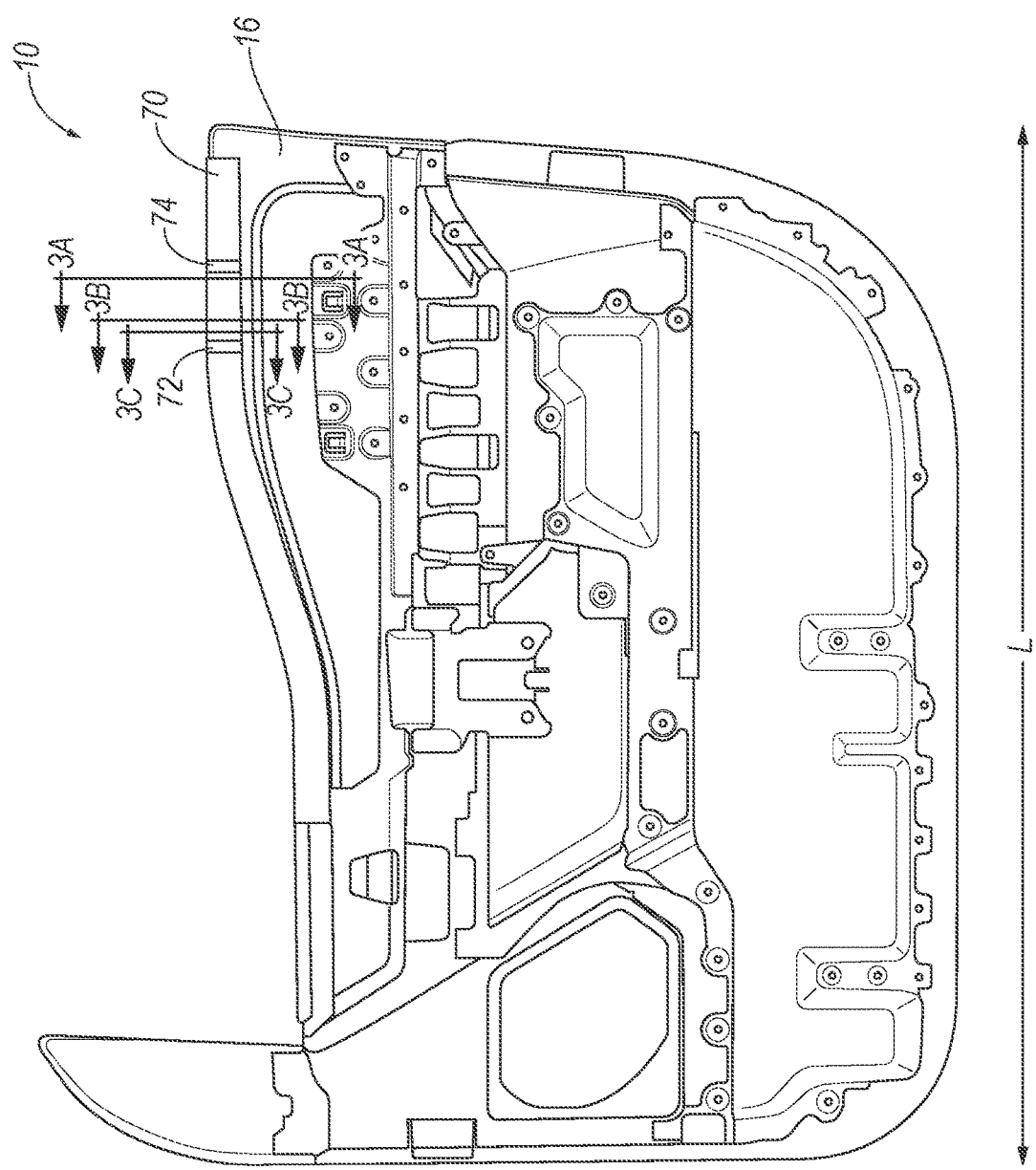
FIG. 3 is a view of a backside of the door-trim panel.
Figure 3A:
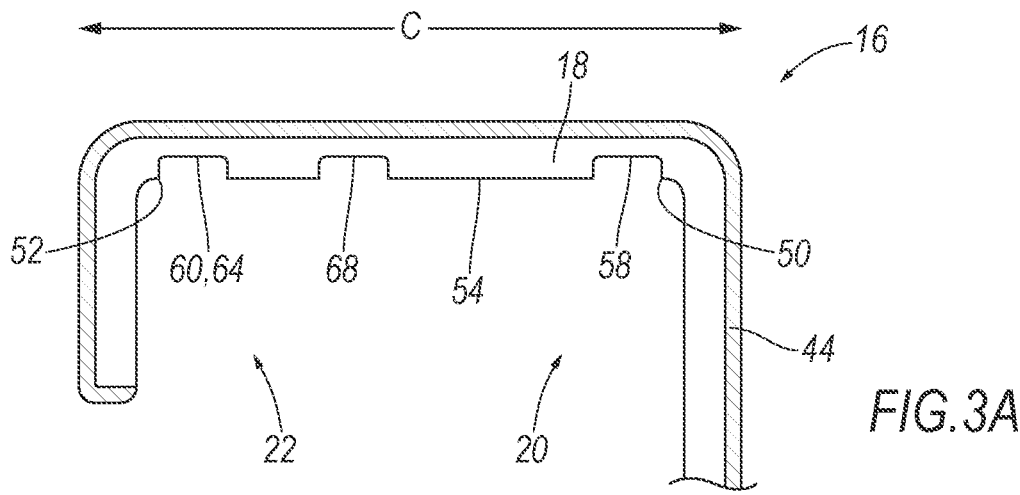
FIG. 3A is cross-sectional view through line A of FIG. 3A.

The outboard rib 30 extends from the outboard portion 22 toward the inboard portion 20 to an inboard end 32. With reference to FIGS. 3C and 6, the inboard end 32 of the outboard rib 30 is the farthest point vehicle-inboard of the outboard rib 30. The inboard end 32 of the outboard rib 30 may be spaced from the inboard portion 20 of the top roll 16, i.e., the inboard end 32 of the outboard rib 30 does not extend across the centerline into the inboard portion 20 of the top roll 16.

With continued reference to FIGS. 3C and 6, the inboard end 32 of the outboard rib 30 may be vehicle-inboard of the outboard end 28 of the inboard rib 26. In other words, the outboard rib 30 may extend toward the inboard end 50 of the upper end 18 the outboard end 28 of the inboard rib 26.

Figure 3B:
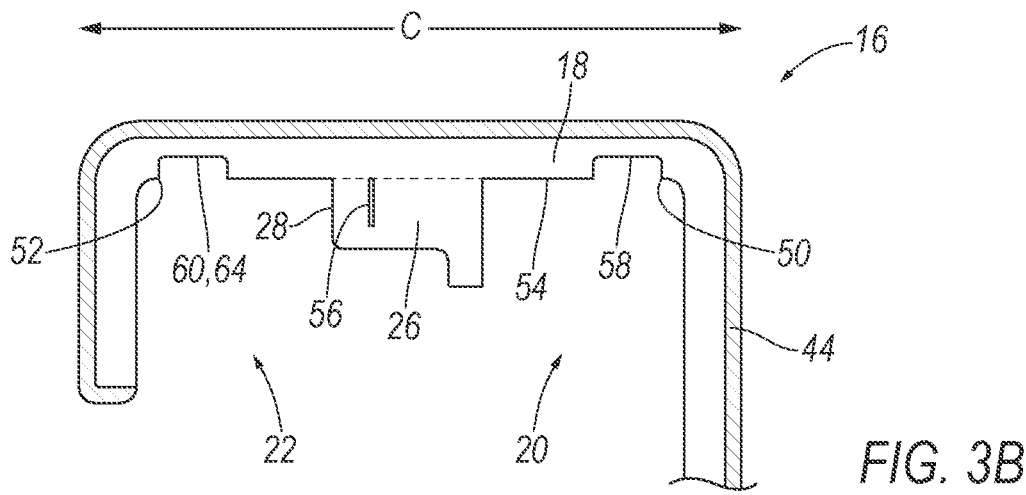
FIG. 3B is a cross-sectional view through line B of FIG. 3B.
Figure 3C:
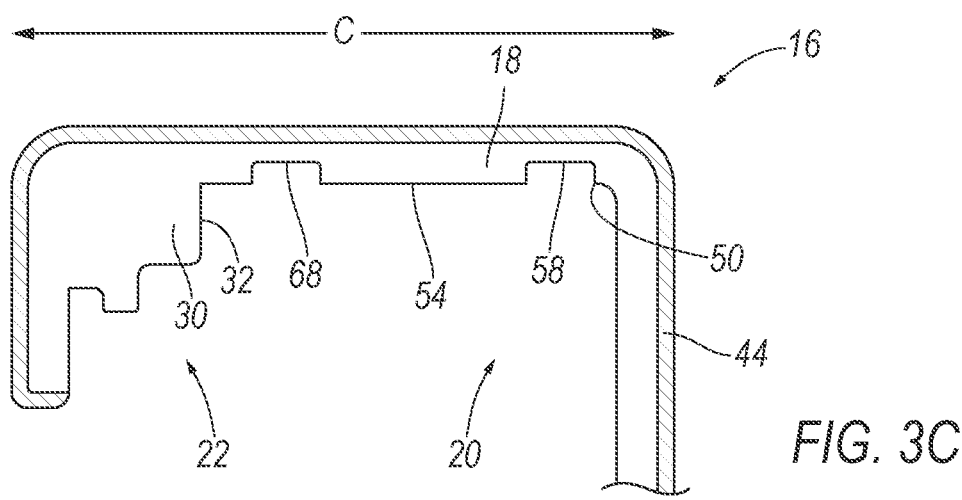
FIG. 3C is a cross-sectional view through line C of FIG. 3C.

With reference to FIGS. 3B and 3C, the inboard ribs 26 and the outboard ribs 30 are elongated generally perpendicular to the longitudinal axis L. The adverb "generally" means that the inboard ribs 26 and the outboard ribs 30 may slightly deviate from perpendicular due to manufacturing and/or design of the top roll 16 and the vehicle 12. Specifically, the inboard ribs 26 and the outboard ribs 30 may extend in the cross-vehicle direction C that is generally perpendicular to the longitudinal axis L. In other words, for each of the pairs of ribs 24, the inboard ribs 26 and the outboard ribs 30 are elongated transverse to the longitudinal axis L.

A gusset 56 may extend from at least one of the inboard ribs 26 to the upper surface 54. The gusset 56 may provide stability to the inboard rib 26 as the inboard ribs 26 extend downwardly from the upper surface 54. In the example shown in FIGS. 5 and 6, at least one gusset 56 extends from each of the inboard ribs 26 to the upper surface 54. Each of the inboard ribs 26 may include more than one gusset 56. The gusset 56 may be on either side of the inboard rib 26 or on both sides of the inboard rib 26. For example, as shown in FIG. 6, some inboard ribs 26 may include a gusset 56 on the side of the inboard rib 26 that faces the vehicle-forward end 48 of the upper end 18 and a gusset 56 on the side of the inboard rib 26 that faces the vehicle-rearward end 46 of the upper end 18. As another example, the inboard rib 26 may include multiple gussets 56 on the side of the inboard rib 26 that faces the vehicle-forward end 48 of the top roll 16 or multiple gussets 56 on the side of the inboard rib 26 that faces the vehicle-rearward end 46 of the top roll 16. Any suitable combination of gussets 56 extending from the inboard ribs 26 may be used to provide stability to the inboard ribs 26.

With reference to FIGS. 3A, 4, 5, and 6, the upper surface 54 includes grooves 58, 60 elongated along the upper surface 54 of the top roll 16. In the event of an impact to the vehicle 12, the vehicle occupant may shift inside the vehicle 12 and the vehicle occupant may move toward and contact the top roll 16 of the door-trim panel 10. In such an event, the grooves 58, 60, in combination with the inboard ribs 26 and the outboard ribs 30, may allow the top roll 16 to collapse in the cross-vehicle direction C and absorb energy from the vehicle occupant contacting the door-trim panel 10. The collapsing of the top roll 16 due to the grooves 58, 60 and the pairs of ribs 24 may allow for less deflection of the thorax of the vehicle occupant.

The upper surface 54 includes a first groove 58 and a second groove 60 between the inboard end 50 of the inboard portion 20 and the outboard end 52 of the outboard portion 22. The first groove 58 and the second groove 60 may each be elongated along the upper surface 54. Specifically, each of the first groove 58 and the second groove 60 may be elongated along the longitudinal axis L of the top roll 16. One of the first groove 58 or second groove 60 is inboard of the other along the longitudinal axis L.

The numerical adverbs "first" and "second" with respect to the grooves 58, 60 are used herein merely as identifiers and do not signify order or importance. The terms "first" and "second" may be used interchangeably when referring to the grooves 58, 60 as shown in the Figures.

The first groove 58 may extend along the upper surface 54 of the top roll 16. Specifically, the first groove 58 may extend continuously along the upper surface 54 of the top roll 16. In other words, the first groove 58 may be unbroken along the upper surface 54 of the top roll 16. As an example, and as shown in the example in FIGS. 4-7, the first groove 58 may extend continuously along the inboard end 50 of the inboard portion 20. In such an example, the first groove 58 may extend continuously from the vehicle-rearward end 46 of the upper end 18 to the vehicle-forward end 48 of the upper end 18. As another example not shown in the Figures, the first groove 58 may extend continuously along the outboard end 52 of the outboard portion 22. In such an example, the first groove 58 may extend continuously from the vehicle-rearward end 46 of the upper end 18 to the vehicle-forward end 48 of the upper end 18. In yet another example, the first groove 58 may extend continuously along any suitable length between the vehicle-forward end 48 and vehicle-rearward end 46 of the top roll 16 along either the inboard end 50 of the upper end 18, the outboard end 52 of the upper end 18, or any suitable position between the inboard end 50 and the outboard end 52.

With reference to FIG. 3A, the second groove 60 may be spaced from the first groove 58 in a direction perpendicular to the longitudinal axis L. In other words, the first groove 58 and the second groove 60 may be spaced from each other in the cross-vehicle direction C. The second groove 60 may extend along the outboard end 52 of the outboard portion 22, i.e., spaced from the first groove 58.

The upper surface 54 may include a plurality 62 of short grooves 64 elongated along the upper surface 54. The short grooves 64 include the second groove 60, i.e., the second groove 60 is one of the plurality 62 of short grooves 64 elongated along the upper surface 54. The second groove 60 may be any one of the plurality 62 of short grooves 64.

The short grooves 64 are co-linear with each other. In other words, each of the short grooves 64 is elongated along a common line extending along the longitudinal axis L. As an example and as shown in the example in the FIGS. 4-7, the short grooves 64 are elongated along the outboard end 52 of the outboard portion 22. The short grooves 64 are spaced from each other along the longitudinal axis L, i.e., the short grooves 64 are spaced from each other along the common line on which the short grooves 64 extend.

Figure 4:
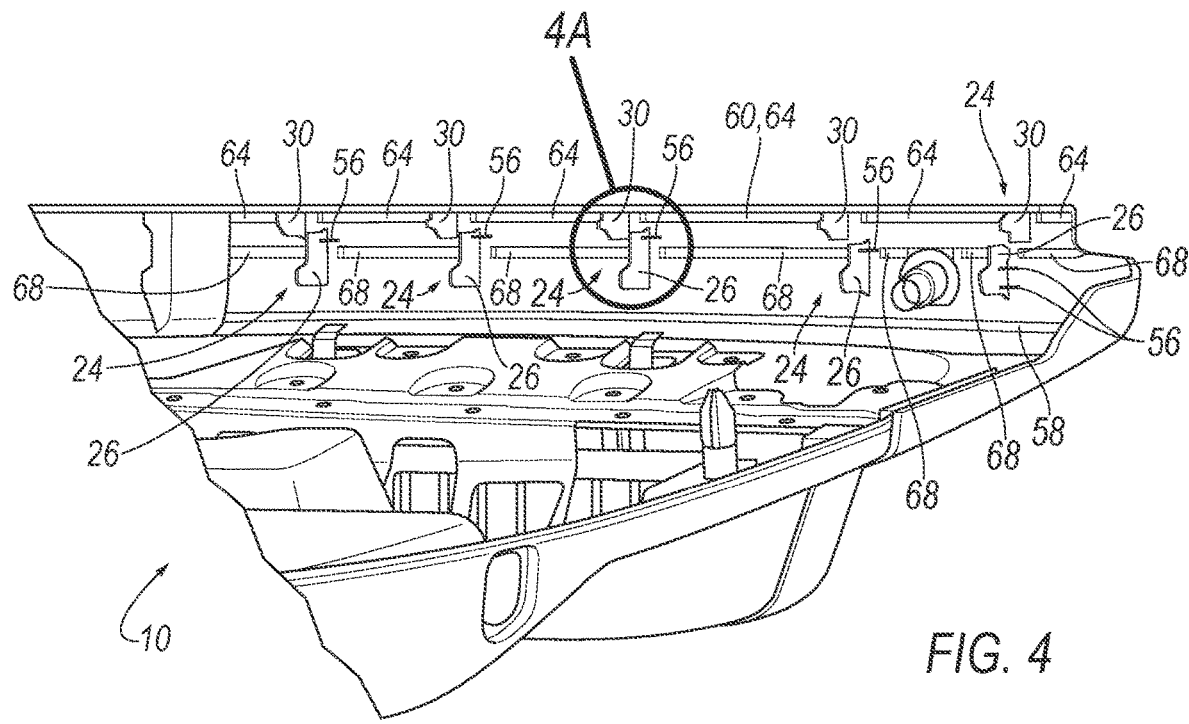
FIG. 4 is an underside, perspective view of a top roll of the door-trim panel having a plurality of grooves and pairs of ribs spaced from each other along a longitudinal axis.
Figure 4A:
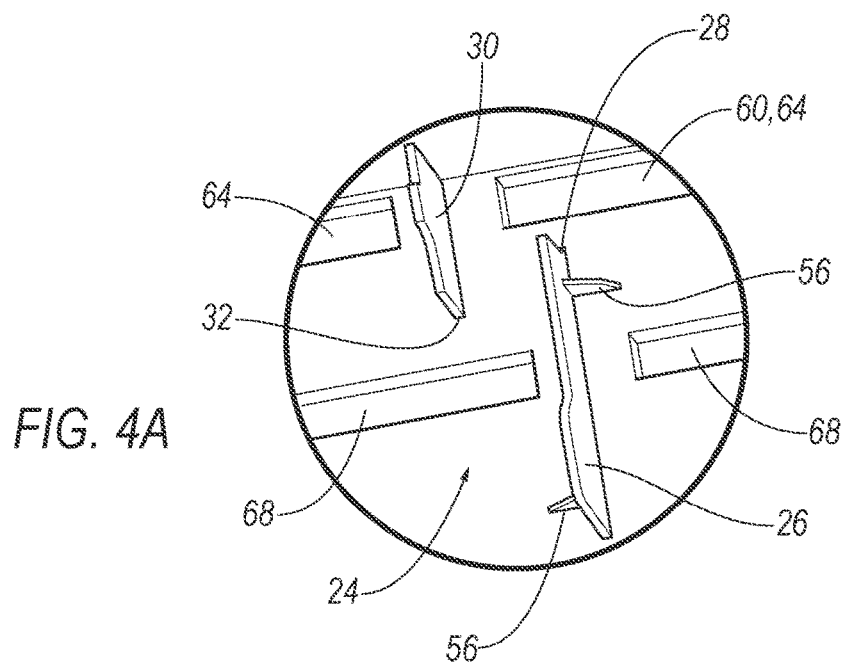
FIG. 4A is a magnified view of a portion of FIG. 4 and from a different perspective.

In the example shown in the Figures, specifically FIGS. 4 and 6, the upper surface 54 includes six short grooves 64 elongated along the outboard end 52 of the outboard portion 22. The six short grooves 64 may vary in length along the outboard end 52 of the outboard portion 22 and are co-linear with each other.

With reference to FIGS. 3A, 4, 5, and 6, the top roll 16 may include a second set 66 of short grooves 68 elongated and spaced along the longitudinal axis L. The second set 66 of short grooves 68 may extend between the first groove 58 and the second groove 60, i.e., between the first groove 58 and the short grooves 64. The second set 66 of short grooves 68 are co-linear with each other. In other words, each of the second set 66 of short grooves 68 are elongated along a common line extending along the longitudinal axis L. In the example in FIGS. 4 and 6, the common line along which the short grooves 68 extend is spaced from the common line along which the second set 66 of short grooves 68 extends.

In the example shown in FIGS. 4 and 6, the upper surface 54 includes seven short grooves 68 elongated along the longitudinal axis L. The seven short grooves 68 may vary in length along the longitudinal axis L and are co-linear with each other.

With continued reference to FIGS. 4 and 6, as discussed above, the short grooves 64 and the second set 66 of short grooves 68 are spaced from each other along the longitudinal axis L. The inboard ribs 26 or the outboard ribs 30 may extend downwardly from the upper surface 54 of the upper end 18 in alternating arrangement with the short grooves 64 or the second set 66 of short grooves 68. In other words, the short grooves 64 and the second set 66 of short grooves 68 alternate with either the inboard ribs 26 or the outboard ribs 30 along the longitudinal axis L. In the example shown in FIGS. 4 and 6, the outboard ribs 30 extend downwardly from the upper surface 54 in alternating arrangement with the short grooves 64 and the inboard ribs 26 extend downwardly from the upper surface 54 in alternating arrangement with the second set 66 of short grooves 68. In such an example, the plurality 62 of short grooves 64 may include a short groove extending between each of the outboard ribs 30 and the second set 66 of short grooves 68 may include a short groove extending between each of the inboard ribs 26.

As discussed above, the first groove 58 may extend continuously along the upper surface 54 of the top roll 16. Specifically, the first groove 58 may extend along at least two of the plurality 62 of short grooves 64 and at least two of short grooves 68 of the second set 66 of short grooves 68. In the example shown in the Figures, the first groove 58 extends along inboard end 50 of the inboard portion 20 and the short grooves 64, 68 of both the plurality 62 of short grooves 64 and the second set 66 of short grooves 68 extend along the longitudinal axis L and are spaced from the first groove 58. In such an example, the six short grooves 64 of the plurality 62 of short grooves 64 and the seven short grooves 68 of the second set 66 of short grooves 68 extend from the vehicle-rearward end 46 of the top roll 16 to the vehicle-forward end 48 of the top roll 16 and the first groove 58 extends along the six short grooves 64 and the seven short grooves 68, i.e., from the vehicle-rearward end 46 of the top roll 16 to the vehicle-forward end 48 of the top roll 16.

As shown in FIGS. 3 and 5, the top roll 16 includes a flange 70 extending downwardly from the upper end 18. Specifically, the flange 70 extends downwardly from the outboard portion 22, e.g., the outboard end 52, of the upper end 18. The flange 70 is elongated along the longitudinal axis L and extends adjacent the window 42 and window opening 40 of the door 38.

The flange 70 may define a groove 72 extending downwardly from the upper end 18. The flange 70 may include a second groove 74 spaced from the groove 72 along the longitudinal axis L. In the event of an impact to the vehicle 12, the groove 72 and the second groove 74 in the flange 70 allows the flange 70 to collapse and absorb energy from a vehicle occupant impacting the door-trim panel 10. The flange 70 may fold at the locations of the groove 72 and the second groove 74 to absorb energy from the vehicle occupant.

Figure 7:
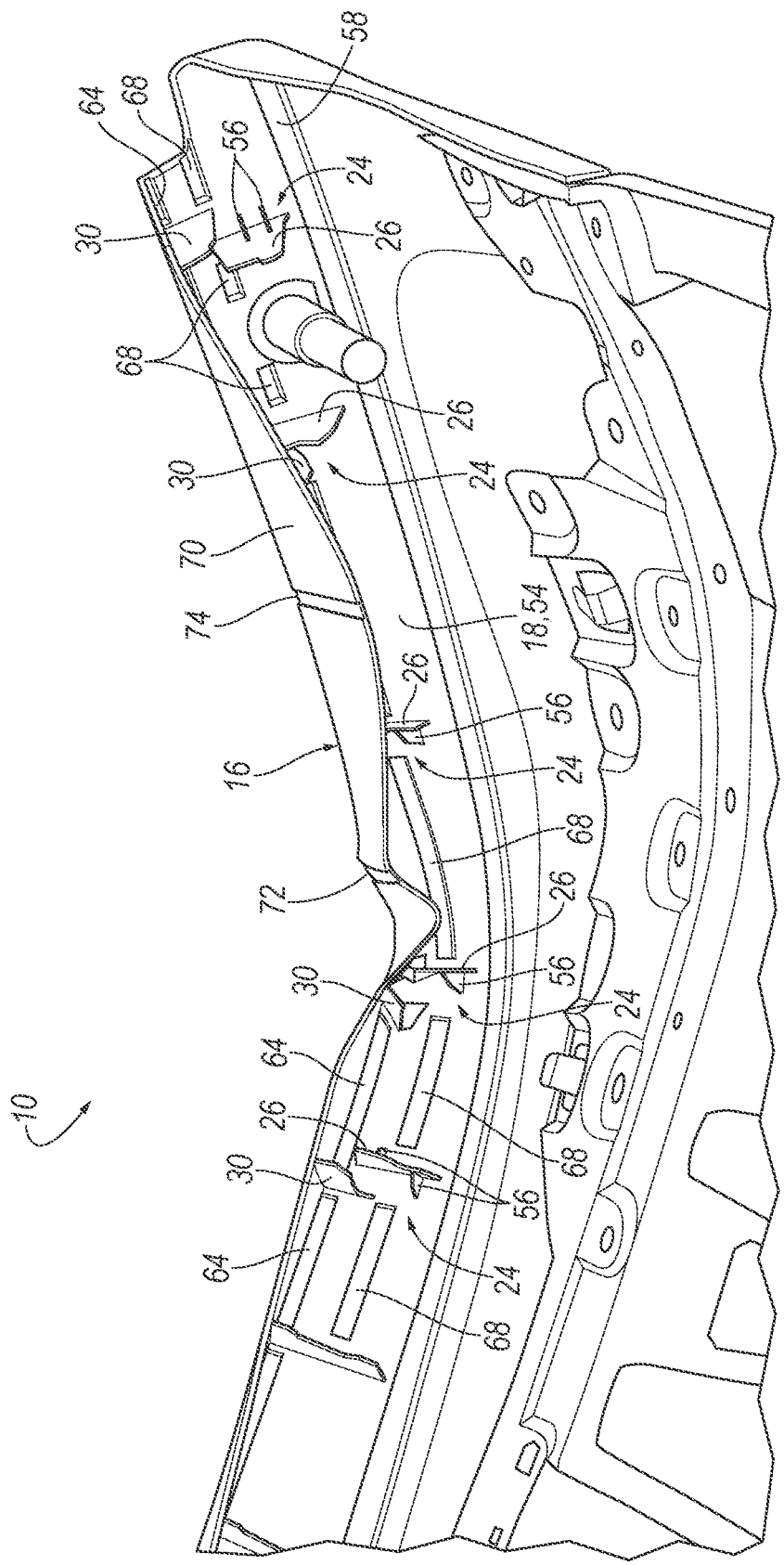
FIG. 7 is an underside, perspective view of the top roll in the event of an impact to the vehicle.

As shown in FIG. 7, the pairs of ribs 24 and the grooves 58, 60, 62, 66, 72, 74 allow the top roll 16 to collapse in the event of an impact to the vehicle 12, for example, a side impact. The collapsing of the top roll 16 absorbs energy from the impact. In the event that the vehicle occupant shifts in the vehicle 12 against the door-trim panel 10, the collapsing of the top roll 16 absorbs energy. The energy absorption may allow for less deflection of the thorax of the vehicle occupant as the top roll 16 is aligned with the thorax of the vehicle occupant.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A door-trim panel comprising:
   an armrest;
   a top roll extending upwardly from the armrest to an upper end, the upper end having an inboard portion and an outboard portion and the upper end being elongated along a longitudinal axis;
   the top roll including pairs of ribs, the pairs of ribs being spaced from each other along the longitudinal axis;
   each of the pair of ribs including an inboard rib extending from the inboard portion toward the outboard portion to an outboard end;
   for each pair of ribs, the inboard rib being elongated transverse to the longitudinal axis and the outboard end of the inboard rib being spaced from the inboard portion of the top roll; and
   each of the pair of ribs including an outboard rib adjacent to and spaced from the inboard rib of that pair;
   for each of the pair of ribs, the outboard rib extending from the outboard portion toward the inboard portion to an inboard end, the outboard rib being elongated transverse to the longitudinal axis and the inboard end of the outboard rib being spaced from the inboard portion of the top roll.

2. The door-trim panel of claim 1, wherein the inboard end of the outboard rib is inboard of the outboard end of the inboard rib.

3. The door-trim panel of claim 1, wherein the inboard ribs and the outboard ribs are in alternating arrangement along the longitudinal axis.

4. The door-trim panel of claim 1, wherein the inboard ribs and the outboard ribs are elongated generally parallel to each other.

5. The door-trim panel of claim 1, wherein the inboard ribs and outboard ribs are elongated generally perpendicular to the longitudinal axis.

6. The door-trim panel of claim 1, wherein the upper end includes an upper surface from which the inboard ribs and the outboard ribs protrude downwardly, and further comprising a gusset extending from at least one of the inboard ribs to the upper surface.

7. The door-trim panel of claim 1, wherein the pairs of ribs are positioned to be aligned with a thorax of a vehicle occupant.

8. The door-trim panel of claim 1, further comprising a flange extending downwardly from the outboard portion of the upper end, the flange defining a groove extending downwardly from the upper end.

9. The door-trim panel of claim 1, wherein the top roll includes an upper surface from which the inboard ribs and the outboard ribs protrude downwardly, the upper surface including a first groove and a second groove each elongated along the longitudinal axis, one of the first or second grooves being inboard of the other along the longitudinal axis.

10. The door-trim panel of claim 9, wherein the upper surface includes a plurality of short grooves including the second groove, the short grooves being spaced from each other along the axis, and the first groove extending along at least two of the short grooves.

11. The door-trim panel of claim 10, wherein the short grooves are co-linear.

12. The door-trim panel of claim 10, wherein the inboard ribs or the outboard ribs are in alternating arrangement with the short grooves.

13. The door-trim panel of claim 10, wherein the top roll includes a second set of short grooves, the inboard ribs being in alternating arrangement with the short grooves and the outboard ribs being in alternating arrangement with the second set of short grooves.

14. A door-trim panel comprising:
an armrest; and
a top roll extending upwardly from the armrest to an upper end, the upper end having an inboard end, an outboard end, and an upper surface extending from the inboard end to the outboard end, the upper end being elongated along a longitudinal axis;
the upper surface including a first groove and a second groove, the first groove and the second groove being between the inboard end and the outboard end and being elongated along the longitudinal axis, the first and second grooves being spaced from each other in a direction perpendicular to the longitudinal axis.

15. The door-trim panel of claim 14, wherein the upper surface includes a plurality of short grooves including the second groove, the short grooves being spaced from each other along the axis, and the first groove extending along at least two of the short grooves.

16. The door-trim panel of claim 15, wherein the short grooves are co-linear.

17. The door-trim panel of claim 15, wherein the top roll includes ribs extending downwardly from the upper surface in alternating arrangement with the short grooves.

18. The door-trim panel of claim 17, wherein the top roll includes a second set of short grooves, inboard ribs extending downwardly from the upper surface in alternating arrangement with the short grooves, and outboard ribs extending downwardly from the upper surface in alternating arrangement with the second set of short grooves.

19. The door-trim panel of claim 18, wherein the first groove extends along at least two short grooves of the second set of short grooves.

20. The door-trim panel of claim 1, wherein for each of the pairs of ribs, the inboard rib and the outboard rib each have a free end and extend downwardly in respective planes from the upper end to the respective free end, the respective planes each being transverse to the longitudinal axis; and
for each rib, the free end is in the plane and spaced downwardly from the upper end.

* * * * *